Sept. 6, 1932.  J. R. GORDON  1,876,409
SEEDING ATTACHMENT FOR LAWN MOWERS
Filed June 30, 1931
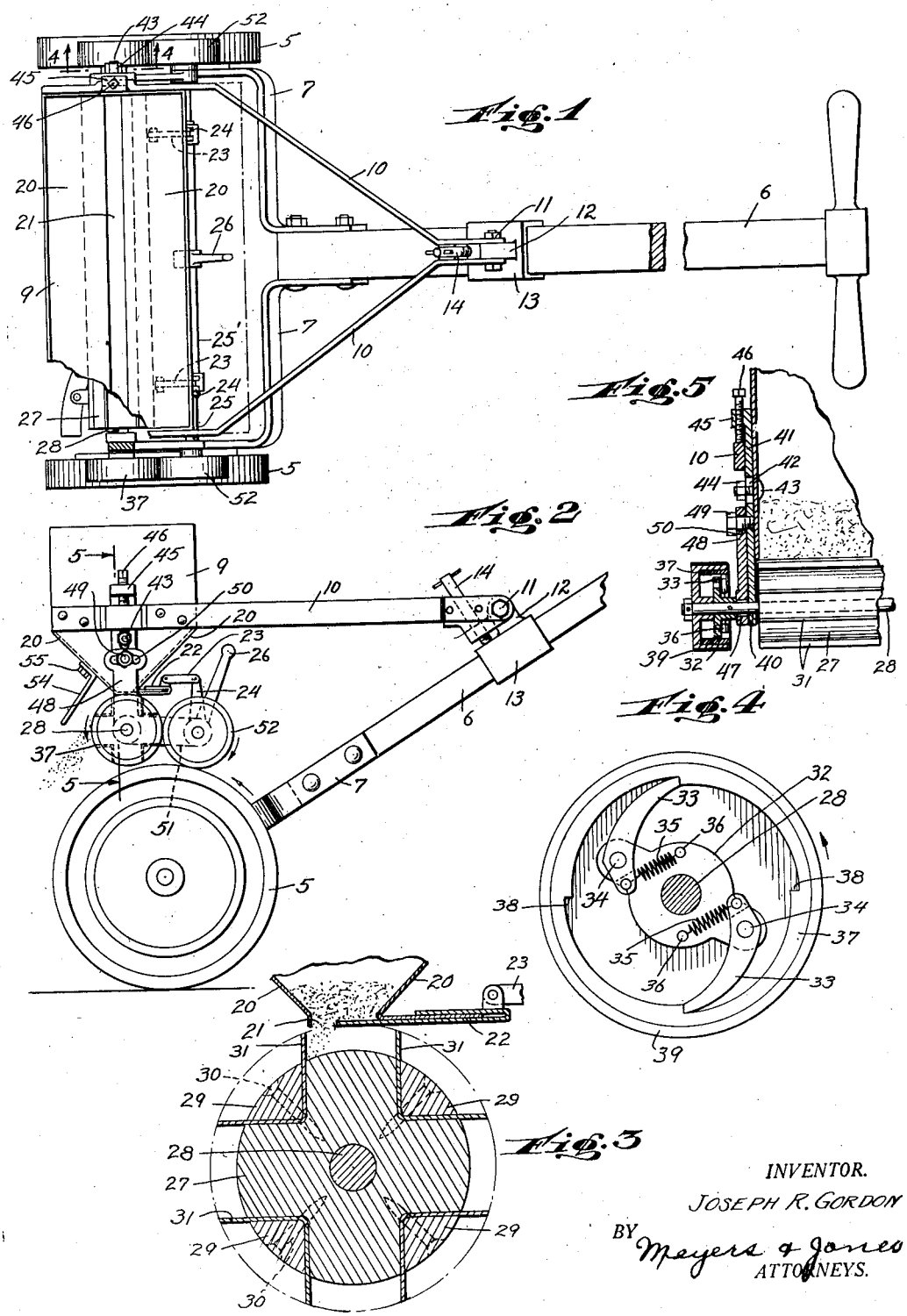
INVENTOR.
JOSEPH R. GORDON
BY Meyers & Jones
ATTORNEYS.

Patented Sept. 6, 1932

1,876,409

UNITED STATES PATENT OFFICE

JOSEPH R. GORDON, OF BALDWIN, NEW YORK, ASSIGNOR OF ONE-HALF TO CHARLOTTE F. WILLEY, OF BALDWIN, LONG ISLAND, NEW YORK

SEEDING ATTACHMENT FOR LAWN-MOWERS

Application filed June 30, 1931. Serial No. 547,956.

My invention relates to a seed and fertilizer distributor for attachment to lawn-mowers.

The objects of the present invention include first, the provision of a seed or fertilizer distributor which can be readily attached to a lawn mower and adjusted relative to rotating parts of the mower for operation thereby to scatter the seed or fertilizer ahead of the mower while the mower is being operated to cut grass; second, the provision of means for causing the distributor to idle when the mower is moved in non-cutting direction; third, the provision of means for operating the distributor by the lawn mower when the mower is not cutting; fourth, the provision of means for adjusting the entire distributor relative to the mower and parts of the distributor relative to parts of the mower and to each other to obtain a steady and even distribution of seed or fertilizer.

The foregoing objects will become apparent and will be specifically referred to during the course of the following detail description of the accompanying drawing, in which Fig. 1 is a top view of a lawn mower with the invention applied thereto, parts being broken away;

Fig. 2 is a side elevation of the apparatus shown in Fig. 1;

Fig. 3 is a sectional view through the seed scattering or distributing member;

Fig. 4 is a sectional view on the line 4—4 of Fig. 1; and

Fig. 5 is a sectional view on the line 5—5 of Fig. 2.

Referring to the drawing, the numeral 5 designates the wheels of a lawn mower which are rotated in the usual manner when a push or pull is exerted on the handle 6 which is connected by arms 7 to the mower. The seed or fertilizer receptacle 9 is held by the arms 10 which embrace the opposite ends of the receptacle and are connected thereto by any suitable means. Arms 10 converge inwardly toward the handle and are pivotally connected by bolt 11 to the upstanding lug 12 on the bracket 13 which is secured to the handle of the lawn mower. The arms 10 may be vertically adjusted by means of the hand screw 14 which engages through the arms 10 and abuts the top surface of the bracket 13. Tightening screw 14 will raise arms 10 and loosening will lower them and the receptacle 9.

The receptacle 9 has converging lower walls 20 at the ends of which is provided an opening 21 through which the seed or fertilizer may escape. The opening 21 can be closed by the plate 22 carried by the link 23 which is secured to or formed as a part of the member 24, rotatably carried on the shaft 25 by a sleeve 25' which is operated by the handle 26. When the handle 26 is moved toward the receptacle 9 it will turn the sleeve 25' and member 24 to move the link 23 and slide plate 22 across the opening 21 to any desired extent. Thus, the opening may not only be controlled to regulate the flow of seed or fertilizer from the receptacle but may be completely closed.

Immediately below the opening 21 is the distributing roller 27 which is mounted on the shaft 28. Although it is possible to utilize a rotary brush, I find that in actual practice, a distributing member such as disclosed in Fig. 3, is very effective and desirable in obtaining an even and good distribution of seed or fertilizer. The distributor shown in Fig. 3 comprises a roller 27 of any suitable material from the outer surface of which sections 29 are removed. Sheets of flexible material, such as, leather, rubber, tough fabric or compositions are inserted in the notches made by removal of sections 29, and the sections 29 are replaced and secured in position by screws or other fastening elements 30 leaving portions 31 of the flexible sheets extending from the periphery of the roller throughout the length of the opening 21. These portions 31 constitute flaps which are so positioned relative to the opening 21 that they will engage the material flowing from the opening and scatter it ahead of the mower in a manner to be hereinafter described.

The shaft 28 is connected, preferably at both ends, to driving members 32 on which the pawls 33 are pivotally mounted at 34. Springs 35 are secured to pins 36, and to the inner ends of the pawls 33 to urge the outer ends of the pawls against the inner surface of the wheels 37, which are made in a form of a ratchet wheel by providing the shoulders or teeth 38. The outer surface 39 of the wheels 37 is covered with a material having a relatively high coefficient of friction.

Shaft 28 is journaled through openings 40 in the lower ends of the plates 41 mounted at opposite sides of the casing 9. Each plate 41 is provided with a vertical slot 42 through which the bolt 43 extends for engagement by a nut 44, and the upper end of each plate has a lug 45 through which the adjusting screws 46 are threaded for engagement with the upper surface of the arms 10. The shaft 28 is also journaled through openings 47 in angle plates 48 which are attached to the plates 41 by means of the screw 49 which has threaded engagement with the plate 41 and which extends through transverse slot 50 in the upper end of the plate 48. The arms 51 of plates 48 extend rearwardly from the shaft 28 and receive the shaft 25 on which are journaled the wheels 52. The outer surfaces of wheels 52 are covered with a material having a relatively high coefficient of friction for frictional engagement with the periphery of the wheels 37.

The attachment is secured to the handle of the lawn mower in the manner previously described by means of the bracket 13 and is then adjusted by means of the hand screw 14 to lower the wheels 37 and 52 toward the wheels 5 of the lawn mower. The desirable arrangement of the parts when grass is to be cut and seed for fertilizer sown at the same time, is that shown in Fig. 2 where the wheel 52 is in contact with the wheel 5 and with the periphery of wheel 37. If this relative arrangement of the parts is not had when the device is lowered through the medium of the screw 14, adjustment of the plate 50 is made by loosening the screw 49 and moving the plate 48 until the heel 52 contacts with the mower wheel. It should be obvious that when the mower is pushed forward the wheel 5 will drive the wheel 52 in a clockwise direction and the wheel 52 will drive the wheel 37 in a counter-clockwise direction, which is the same direction in which the mower wheel 50 rotates. The ends of the pawls 33 are engaged by the teeth 38 and the shaft 28 and distributor 27 are rotated beneath the opening 21 with respect to which plate 22 has been previously adjusted. When the parts are in the relative position shown in Fig. 2, when the lawn mower is pulled backward or in non-cutting direction, the wheel 52 will drive the wheel 37 in the opposite direction whereby the interior of the wheel 37 will slide over the pawls 33 and the shaft 28 and distributor 27 will be idle.

There may be times when the ground is of such a nature or in such condition and the grass is not to be cut but it is desirable to scatter seed or fertilizer. In such case, the screw 49 would again be loosened and the plate 48 adjusted through the slot 50 to swing the wheel 52 out of contact with the wheel 5 and placing the wheel 37 in contact with the wheel 5. The mower would now be operated reversely, that is, it would be pulled backward so that the cutting blades would not operate and wheel 5 would drive the wheel 37 directly to rotate it in the same direction as previously described. Thus, the seed or fertilizer may be distributed without operating the cutting parts of the mower.

It may be that wear on the distributor blades or brush will develop and that adjustment of the distributor relative to the openings 21 would be required. In such case, the nut 44 would be loosened and a nut 46 operated to lift the distributor toward the opening. By the same means the distributor may be lowered if it is operating too close to the opening to obtain a proper distribution of the seed or fertilizer. In order to prevent the seed or fertilizer from being scattered too far and wide, I propose to secure a baffle plate 54 to the front wall 20 of the casing 9 by any suitable means such as screws or bolts 55 and this baffle plate may be made adjustable or it may be placed at a fixed predetermined deflecting angle.

It will be apparent that when the device is once been applied to the mower, it may be left thereon, as it in no way interferes with the cutting operation of the mower blades.

I claim:

1. In combination with a lawn-mower including wheels, a seed or fertilizer distributor comprising a receptacle, means for supporting the receptacle above the wheels of the mower, a distributing member rotatably mounted beneath the receptacle, projections on said distributing member to scatter seed or fertilizer directly from the receptacle and means between said distributing member and the mower wheels for rotating the distributor in the same direction as the mower wheels.

2. In combination with a lawn mower, a seed or fertilizer distributor comprising a receptacle having an opening, supports engaging the receptacle and the handle of the lawn mower, an adjustor operable between said support and the handle for regulating the position of the receptacle relative to the cutting blades and wheels of the mower, a distributing roller adjacent the opening in the receptacle, and means for rotating said roller when the mower is moved.

3. A seed or fertilizer distributing attachment for lawn mowers, comprising a seed or fertilizer containing receptacle, a support for mounting said receptacle above the wheels of the mower, said receptacle having an escapement opening in its bottom, a distributing member rotatably mounted adjacent said opening, a wheel engageable with the lawn mower wheel for rotation thereby in a direction opposite to the direction of rotation of the mower wheel, and a second wheel engageable with said first wheel, for rotation thereby in the same direction as the rotation of the mower wheel, a ratchet drive on said second wheel connected to said distributing member for rotating same only in the direction of rotation of the mower wheels.

4. A seed or fertilizer distributing attachment for lawn mowers comprising a receptacle having an opening in its bottom, a support for attaching said receptacle to the lawn mower above the wheels and cutting blades of the mower, a distributing roller rotatably mounted adjacent said opening, a pair of wheels one driven by the mower wheel and driving the other wheel and said other wheel driving said distributor, a support for said distributor, means cooperating with said support for adjusting said distributor relative to the opening, and a support for said pair of wheels adjustably mounted on said distributor support.

5. A seed or fertilizer distributing attachment for lawn mowers comprising a receptacle having an opening in its bottom, a support for attaching said receptacle to the lawn mower above the wheels and cutting blades of the mower, a distributing roller rotatably mounted adjacent said opening, a pair of wheels one driven by the mower wheel and driving the other wheel and said distributor, a support for said wheels and distributor, said support being adjustable to move said first wheel from contact with the mower wheel and bring said second wheel into contact with the mower wheel.

6. A seed or fertilizer distributing device for attachment to lawn mowers comprising a container for the seed or fertilizer having an escapement opening, a distributor mounted adjacent the opening, a pair of wheels for operating said distributor, and means for mounting said wheels for selective contact by the wheels of the mower.

7. The structure of claim 6 wherein means is provided for moving said container distributor and distributor operating wheels as a unit relative to the mower wheels.

8. A seed or fertilizer distributor comprising a seed or fertilizer container having an escapement opening, means for mounting said distributor on a wheeled machine, a pair of driving wheels on the distributor, a distributing member, means operatively connecting said member and one of said driving wheels, and means for relatively bringing either of said wheels into contact with the wheel of said machine.

9. A seed or fertilizer distributing attachment for lawn mowers, comprising a receptacle having an opening in its bottom, a support for attaching said receptacle to the lawn mower above the wheels and cutting blades of the mower, a distributing member rotatably mounted at the bottom of said receptacle adjacent said opening, a pair of wheels for selective engagement with a wheel of the lawn mower to be driven thereby and to drive said distributing member, a support for said pair of wheels adjustably carried on the receptacle, said support comprising a substantially L-shaped member having one arm disposed in a substantially horizontal plane above the wheel of the mower, said pair of wheels being mounted on said arm.

Signed at New York city, in the county of New York and State of New York this 22nd day of June A. D. 1931.

JOSEPH R. GORDON.